(12) United States Patent
Ogasawara et al.

(10) Patent No.: US 10,727,524 B2
(45) Date of Patent: Jul. 28, 2020

(54) CELL STACK DEVICE

(71) Applicant: NGK INSULATORS, LTD., Nagoya-shi, Aichi (JP)

(72) Inventors: Noriyuki Ogasawara, Nagoya (JP); Hirofumi Kan, Nagoya (JP); Makoto Ohmori, Nagoya (JP); Takashi Ryu, Nagoya (JP)

(73) Assignee: NGK INSULATORS, LTD., Nagoya-Shi, Aichi (JP)

( * ) Notice: Subject to any disclaimer, the term of this patent is extended or adjusted under 35 U.S.C. 154(b) by 0 days.

(21) Appl. No.: 16/552,742

(22) Filed: Aug. 27, 2019

(65) Prior Publication Data

US 2020/0020969 A1  Jan. 16, 2020

Related U.S. Application Data

(63) Continuation of application No. PCT/JP2019/008138, filed on Mar. 1, 2019.

(30) Foreign Application Priority Data

Jul. 12, 2018 (JP) .................. 2018-132678
Oct. 25, 2018 (JP) .................. 2018-201174

(51) Int. Cl.
*H01M 2/38* (2006.01)
*H01M 8/2484* (2016.01)
(Continued)

(52) U.S. Cl.
CPC ....... *H01M 8/2484* (2016.02); *H01M 8/0236* (2013.01); *H01M 8/0271* (2013.01); *H01M 8/2428* (2016.02); *H01M 2008/1293* (2013.01)

(58) Field of Classification Search
CPC ............ H01M 8/2484; H01M 8/2428; H01M 8/0236; H01M 8/0274; H01M 2008/1293
See application file for complete search history.

(56) References Cited

U.S. PATENT DOCUMENTS

2003/0049506 A1  3/2003  Yang et al.
2016/0126569 A1  5/2016  Kwon et al.
2016/0164128 A1  6/2016  Ono et al.

FOREIGN PATENT DOCUMENTS

DE    102015216914 A1   5/2016
JP       2004234969 A    8/2004
(Continued)

OTHER PUBLICATIONS

Notification of Transmittal of the International Search Report and the Written Opinion of the International Searching Authority of corresponding PCT/JP2019/008138, in Japanese (2 pages).
(Continued)

*Primary Examiner* — Jane J Rhee
(74) *Attorney, Agent, or Firm* — Flynn Thiel, P.C.

(57) ABSTRACT

A cell stack device includes a manifold, a fuel cell, and an oxygen-containing-gas ejection portion. The manifold includes a fuel gas supply chamber and a fuel gas collection chamber. The fuel cell extends upward from the manifold. The oxygen-containing-gas ejection portion is disposed upward of the center of the fuel cell. The oxygen-containing-gas ejection portion ejects oxygen-containing gas toward the fuel cell. A support substrate of the fuel cell includes a first gas channel and a second gas channel. The first gas channel is connected to a fuel gas supply chamber, and the second gas channel is connected to the fuel gas collection chamber. The first gas channel and the second gas channel are connected to each other in an upper end portion of the fuel cell.

10 Claims, 18 Drawing Sheets

(51) Int. Cl.
    *H01M 8/0271*     (2016.01)
    *H01M 8/0236*     (2016.01)
    *H01M 8/2428*     (2016.01)
    *H01M 8/124*      (2016.01)

(56) References Cited

FOREIGN PATENT DOCUMENTS

| | | |
|---|---|---|
| JP | 2005166529 A | 6/2005 |
| JP | 2007026856 A | 2/2007 |
| JP | 2007211268 A | 8/2007 |
| JP | 2015018749 A | 1/2015 |
| JP | 2015053186 A | 3/2015 |
| JP | 2016171064 A | 9/2016 |
| WO | 2015012372 A1 | 1/2015 |

OTHER PUBLICATIONS

International Search Report of corresponding PCT/JP2019/008138, dated May 14, 2019, in both Japanese and English (6 pages).
Written Opinion of the International Searching Authority of corresponding PCT/JP2019/008138, dated May 14, 2019, in both Japanese and English (6 pages).
English language International Search Report for corresponding application No. PCT/JP2019/008138, dated May 14, 2019 (2 pages).
Office Action from German Patent Office issued in German Application No. 11 2019 000 027.6, dated Mar. 18, 2020 with English Translation (9 pages).

CELL STACK DEVICE

CROSS-REFERENCE TO RELATED APPLICATIONS

This application is a continuation application of PCT/JP2019/008138, filed Mar. 1, 2019, which claims priority to Japanese Application No. 2018-132678, filed Jul. 12, 2018, and Japanese Application No. 2018-201174, filed Oct. 25, 2018, the entire contents all of which are incorporated hereby by reference.

TECHNICAL FIELD

The present invention relates to a cell stack device.

BACKGROUND ART

A cell stack device including a fuel cell and a manifold for supplying gas to the fuel cell is known. The fuel cell includes a support substrate provided with a gas channel and a power generation element portion supported by the support substrate. Supply gas is supplied from a lower end portion of the support substrate to the gas channel, whereas unreacted gas is ejected from an upper end portion of the support substrate to the outside.

CITATION LIST

Patent Literature

Patent Literature 1: JP 2016-171064A

SUMMARY

Technical Problem

There is a demand for an improvement in the efficiency of gas usage in a cell stack device as described above. In view of this, the present invention aims to provide a cell stack device capable of improving the efficiency of gas usage.

Solution to Problem

A cell stack device according to an aspect of the present invention includes a manifold, a fuel cell, and an oxygen-containing-gas ejection portion. The manifold includes a fuel gas supply chamber and a fuel gas collection chamber. The fuel cell extends upward from the manifold. The oxygen-containing-gas ejection portion is disposed upward of the center of the fuel cell. The oxygen-containing-gas ejection portion is configured to eject oxygen-containing gas toward the fuel cell. The fuel cell includes a flat support substrate, and a power generation element portion disposed on a main surface of the support substrate. The support substrate includes at least one first gas channel and at least one second gas channel. The first gas channel is connected to the fuel gas supply chamber, and extends upward from the fuel gas supply chamber. The second gas channel is connected to the fuel gas collection chamber, and extends upward from the fuel gas collection chamber. The first gas channel and the second gas channel are connected to each other in an upper end portion of the fuel cell.

With this configuration, unreacted gas in gas that has flowed through the first gas channel flows through the second gas channel, and unreacted gas in the gas that has flowed through the second gas channel is collected in the gas collection chamber of the gas manifold. Thus, it is possible to improve the efficiency of gas usage.

Also, the fuel cell constituted as described above has a temperature distribution such that the temperature of an upper portion located outward of the center is higher. In order to reduce unevenness in the temperature distribution, in the cell stack device according to an aspect of the present invention, the oxygen-containing-gas ejection portion is disposed upward of the center of the fuel cell and is configured to eject oxygen-containing gas toward the fuel cell. Thus, the temperature of the upper portion located outward of the center of the fuel cell decreases due to oxygen-containing gas, and unevenness in the temperature distribution can be reduced.

Preferably, the oxygen-containing-gas ejection portion is configured to eject oxygen-containing gas downward.

Preferably, the oxygen-containing-gas ejection portion is disposed on an upper side of the fuel cell, and is configured to eject oxygen-containing gas from the upper side of the fuel cell toward the fuel cell.

Preferably, the first gas channel is disposed on a first side in a width direction of the fuel cell, and the second gas channel is disposed on a second side in the width direction of the fuel cell. The cell stack device further includes an ejection direction adjustment means. The ejection direction adjustment means is configured to adjust a direction in which oxygen-containing gas is ejected, in a lower end portion of the fuel cell.

Preferably, the ejection direction adjustment means is configured to cause oxygen-containing gas to be ejected toward the first side. With this configuration, oxygen-containing gas that has flowed on the second side of a main surface of the fuel cell in the width direction is ejected toward the first side in the lower end portion of the fuel cell. The temperature of oxygen-containing gas that has flowed on the second side is lower than that of oxygen-containing gas that has flowed on the first side in the width direction. Thus, oxygen-containing gas that has flowed on the second side makes it possible to reduce the temperature of a bonding material for bonding the fuel cell and the manifold to each other, and to suppress cracking.

Preferably, the ejection direction adjustment means is configured to cause oxygen-containing gas to be ejected toward the second side. With this configuration, oxygen-containing gas that has flowed on the first side of a main surface of the fuel cell in the width direction is ejected toward the second side in the lower end portion of the fuel cell. The temperature of oxygen-containing gas that has flowed on the first side is higher than that of oxygen-containing gas that has flowed on the second side in the width direction. Thus, oxygen-containing gas that has flowed on the first side makes it possible to raise the temperature of the power generation element portion disposed in the lower end portion of the fuel cell and improve performance.

Preferably, the ejection direction adjustment means is configured to cause oxygen-containing gas to be ejected toward both the first side and the second side.

Preferably, the support substrate further includes a connection channel for connecting the first gas channel and the second gas channel in an upper end portion.

Preferably, the fuel cell further includes a connection member that is attached to an upper end portion of the support substrate. The connection member includes a connection channel for connecting the first gas channel and the second gas channel.

Preferably, the cell stack device further includes a plurality of the fuel cells and a current collector member. The current collector member is disposed between adjacent fuel cells. The current collector member is configured to electrically connect adjacent fuel cells to each other in the upper portions of the fuel cells. With this configuration, the current collector member is disposed between adjacent fuel cells in the upper end portions of the fuel cells, and thus vibration of the fuel cells can be reduced. As a result, it is possible to reduce defects in the cell stack device caused by vibration.

Advantageous Effects

According to the present invention, it is possible to improve the efficiency of gas usage.

DESCRIPTION OF EMBODIMENTS

Figure 1:
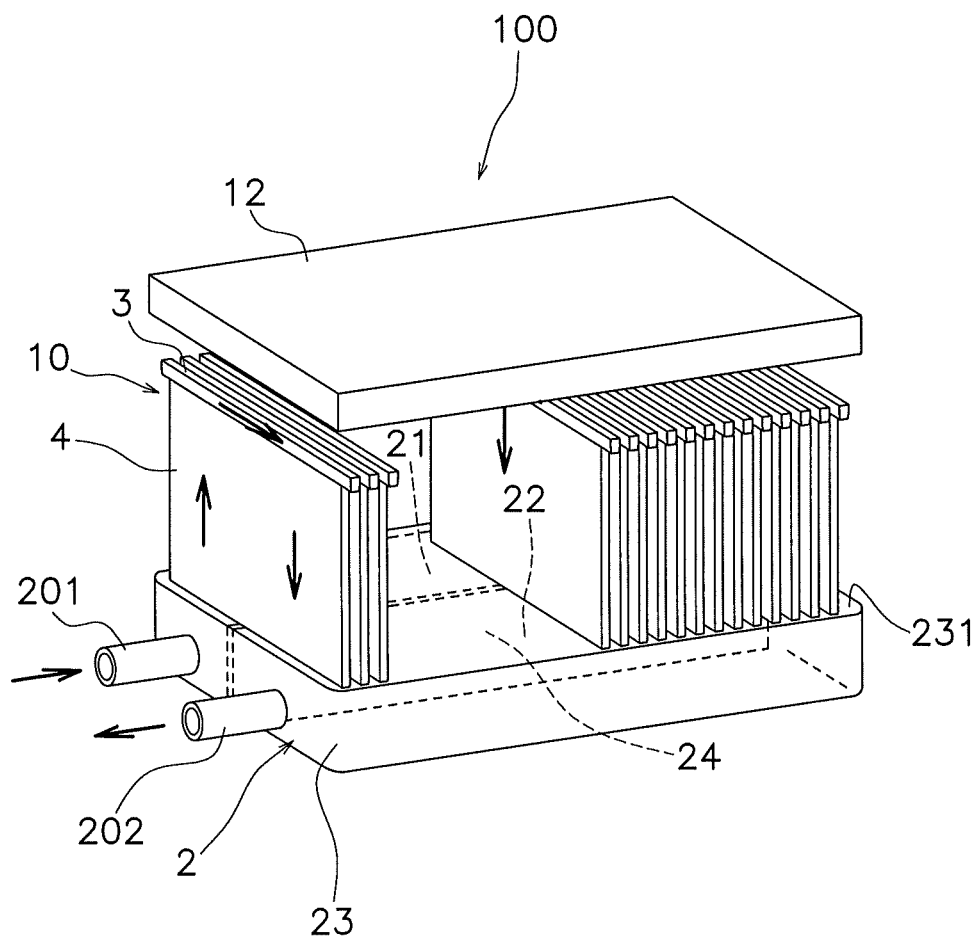
FIG. 1 is a perspective view of a cell stack device.

Hereinafter, an embodiment of a cell stack device according to the present invention will be described with reference to the drawings. Note that this embodiment will be described using, as one example of a fuel cell, a fuel cell, more specifically, a solid oxide fuel cell (SOFC). FIG. 1 is a perspective view showing a cell stack device. Note that some fuel cells are not shown in FIG. 1.

Cell Stack Device

As shown in FIG. 1, a cell stack device 100 includes a manifold 2, a plurality of fuel cells 10, and an oxygen-containing-gas ejection portion 12.

Manifold

The manifold 2 is configured to supply fuel gas to the fuel cells 10. Also, the manifold 2 is configured to collect fuel gas ejected from the fuel cells 10. The manifold 2 includes a fuel gas supply chamber 21 and a fuel gas collection chamber 22.

A gas supply pipe 201 is connected to the fuel gas supply chamber 21, and a gas collection pipe 202 is connected to the fuel gas collection chamber 22. Fuel gas is supplied to the fuel gas supply chamber 21 through the gas supply pipe 201. Also, fuel gas in the fuel gas collection chamber 22 is collected from the manifold 2 through the gas collection pipe 202.

The manifold 2 includes a manifold main body 23 and a partition plate 24. The manifold main body 23 has an internal space. The manifold main body 23 has a rectangular parallelepiped shape.

Figure 2:
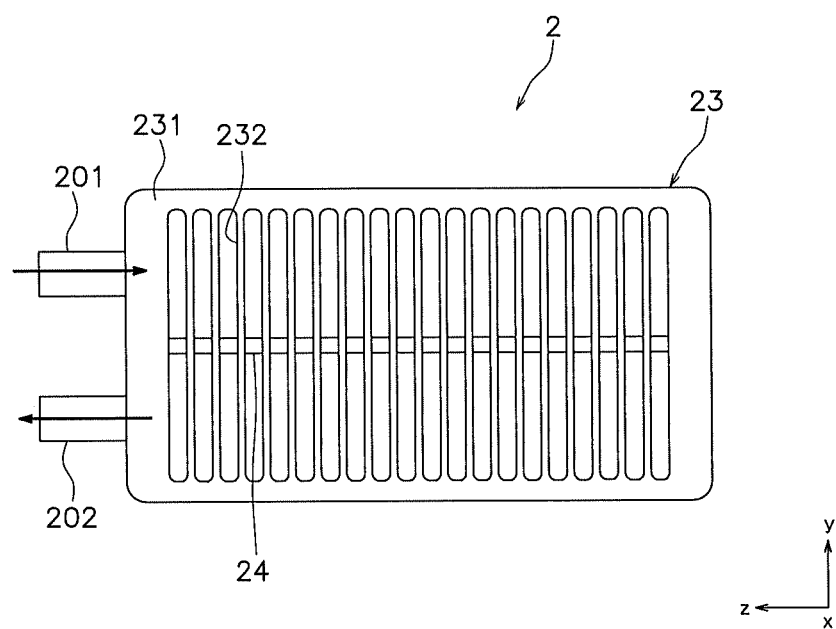
FIG. 2 is a plan view of a manifold.

As shown in FIG. 2, an upper plate portion 231 of the manifold main body 23 is provided with a plurality of through holes 232. The through holes 232 are arranged at intervals in a length direction (the Z-axis direction) of the manifold main body 23. The through holes 232 extend in a width direction (the Y-axis direction) of the manifold main body 23. The through holes 232 are in communication with the fuel gas supply chamber 21 and the fuel gas collection chamber 22. Note that each through hole 232 may be divided into a portion that is in communication with the fuel gas supply chamber 21 and a portion that is in communication with the fuel gas collection chamber 22.

The partition plate 24 partitions the space of the manifold main body 23 into the fuel gas supply chamber 21 and the fuel gas collection chamber 22. Specifically, the partition plate 24 extends in the length direction of the manifold main body 23 at a substantially central portion of the manifold main body 23. The partition plate 24 needs not completely partition the space of the manifold main body 23, and a gap may be formed between the partition plate 24 and the manifold main body 23.

Fuel Cell

The fuel cells 10 extend upward from the manifold 2. Specifically, lower end portions of the fuel cells 10 are attached to the manifold 2. The fuel cells 10 are arranged such that main surfaces of the fuel cells 10 face each other. Also, the fuel cells 10 are arranged at intervals in the length direction (the Z-axis direction) of the manifold 2. That is, an arrangement direction of the fuel cells 10 is along the length direction of the manifold 2. Note that the fuel cells 10 need not be disposed at equal intervals in the length direction of the manifold 2.

Figure 3:
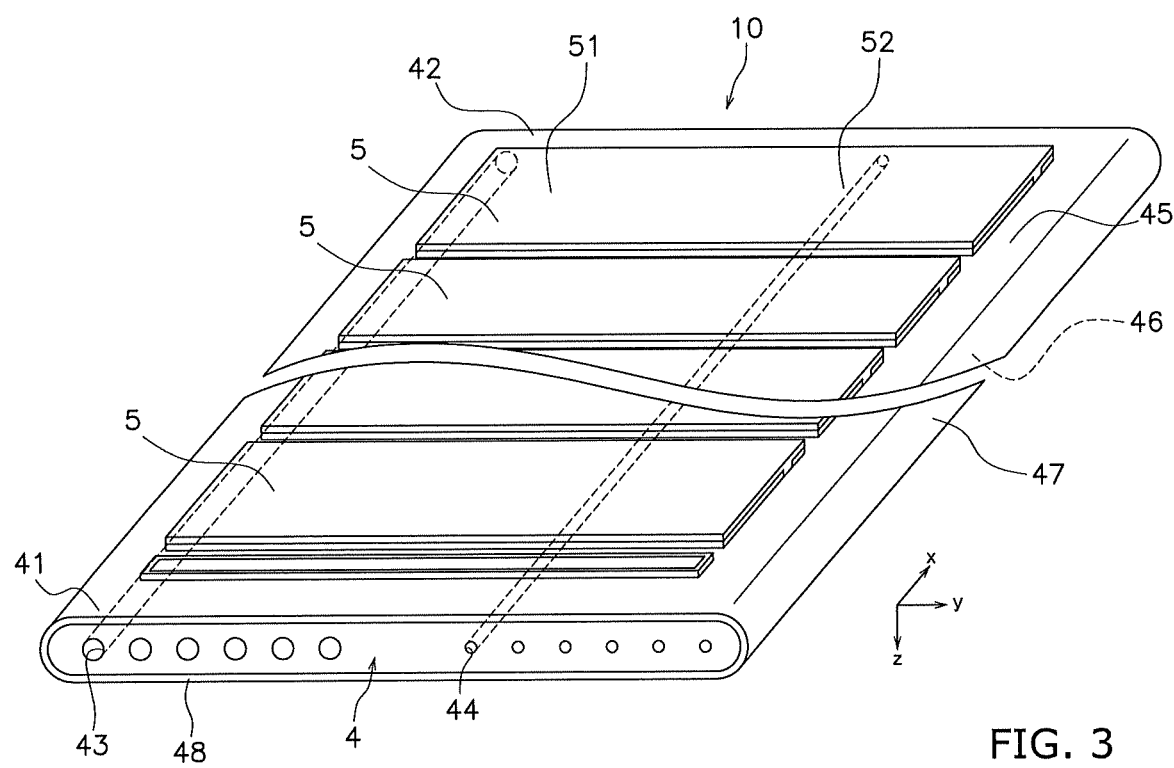
FIG. 3 is a perspective view of a fuel cell.
Figure 4:
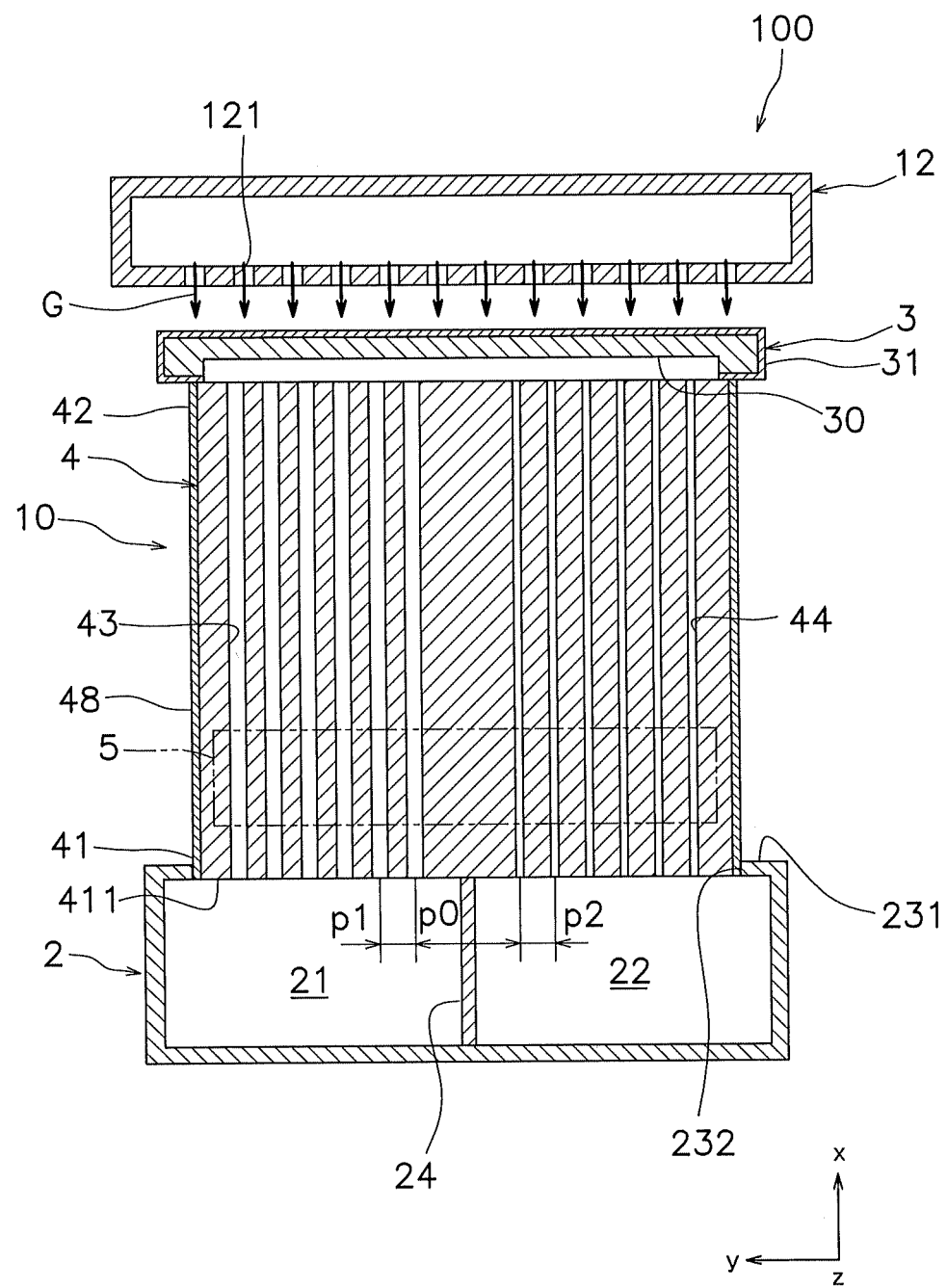
FIG. 4 is a cross-sectional view of the cell stack device.

As shown in FIGS. 3 and 4, the fuel cells 10 each include a support substrate 4, a plurality of power generation element portions 5, and a connection member 3. The power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

Support Substrate

The support substrate 4 extends from the manifold 2 in the vertical direction. Specifically, the support substrate 4 extends upward from the manifold 2. The support substrate 4 has a flat shape, and has a lower end portion 41 and an upper end portion 42. The lower end portion 41 and the upper end portion 42 are both end portions of the support substrate 4 in the length direction (the X-axis direction).

The lower end portion 41 of the support substrate 4 is attached to the manifold 2. For example, the lower end portion 41 of the support substrate 4 is attached to the upper plate portion 231 of the manifold 2 with use of a bonding material or the like. Specifically, the lower end portion 41 of the support substrate 4 is inserted into a through hole 232 formed in the upper plate portion 231. Note that the lower end portion 41 of the support substrate 4 need not be inserted into the through hole 232. As a result of the lower end portion 41 of the support substrate 4 being attached to the manifold 2 in this manner, the lower end portion 41 of the support substrate 4 is linked to the fuel gas supply chamber 21 and the fuel gas collection chamber 22.

The support substrate 4 includes a plurality of first gas channels 43 and a plurality of second gas channels 44. The first gas channels 43 are disposed on a first side (the left side in FIG. 4) in the width direction (the Y-axis direction) of the fuel cell 10. The second gas channels 44 are disposed on a second side (the right side in FIG. 4) in the width direction (the Y-axis direction) of the fuel cell 10. Note that the second side of the fuel cell 10 in the width direction is opposite to the first side.

The first gas channels 43 extend in the vertical direction in the support substrate 4. That is, the first gas channels 43 extend in the length direction (the X-axis direction) of the support substrate 4. The first gas channels 43 pass through the support substrate 4. The first gas channels 43 are disposed at intervals in the width direction (the Y-axis direction) of the support substrate 4. Note that the first gas channels 43 are preferably disposed at equal intervals. The length of the support substrate 4 in the width direction (the Y-axis direction) may be longer than the length of the support substrate 4 in the length direction (the X-axis direction).

As shown in FIG. 4, a pitch p1 of adjacent first gas channels 43 is about 1 to 5 mm, for example. The pitch p1 of adjacent first gas channels 43 indicates the distance between centers of the first gas channels 43. For example, an average value of pitches obtained by measuring pitches of first gas channels 43 in the lower end portion 41, the central portion, and the upper end portion 42 may be used as the pitch p1 of first gas channels 43.

The first gas channels 43 extend from the lower end portion 41 of the support substrate 4 toward the upper end portion 42 of the support substrate 4. The first gas channels 43 are connected to the fuel gas supply chamber 21 on the lower end portion 41 side in a state in which the fuel cell 10 is attached to the manifold 2.

The second gas channels 44 extend in the vertical direction in the support substrate 4. That is, the second gas channels 44 extend in the length direction (the X-axis direction) of the support substrate 4. The second gas channels 44 extend substantially in parallel to the first gas channels 43.

The second gas channels 44 pass through the support substrate 4. The second gas channels 44 are disposed at intervals in the width direction (the Y-axis direction) of the support substrate 4. Note that the second gas channels 44 are preferably disposed at equal intervals.

A pitch p2 of adjacent second gas channels 44 is about 1 to 5 mm, for example. The pitch p2 of adjacent second gas channels 44 indicates the distance between centers of the second gas channels 44. For example, an average value of pitches obtained by measuring pitches of second gas channels 44 in the lower end portion 41, the central portion, and the upper end portion 42 may be used as the pitch p2 of second gas channels 44. Note that the pitch p2 between second gas channels 44 is preferably substantially equal to the pitch p1 between first gas channels 43.

The second gas channels 44 extend from the upper end portion 42 of the support substrate 4 toward the lower end portion 41 of the support substrate 4. The second gas channels 44 are connected to the fuel gas collection chamber 22 of the manifold 2 on the lower end portion 41 side in a state in which the fuel cell 10 is attached to the manifold 2.

A pitch p0 of a first gas channel 43 and a second gas channel 44 that are adjacent to each other is about 1 to 10 mm, for example. The pitch p0 of the first gas channel 43 and the second gas channel 44 that are adjacent to each other indicates the distance between the center of the first gas channel 43 and the center of the second gas channel 44. For example, the pitch p0 can be measured on a first end surface 411 of the support substrate 4.

The pitch p0 of the first gas channel 43 and the second gas channel 44 that are adjacent to each other is larger than the pitch p1 of adjacent first gas channels 43. Also, the pitch p0 of the first gas channel 43 and the second gas channel 44 that are adjacent to each other is larger than the pitch p2 of adjacent second gas channels 44.

The first gas channels 43 and the second gas channels 44 are connected to each other on the upper end portion 42 side of the support substrate 4. Specifically, the first gas channels 43 and the second gas channels 44 are connected to each other via a connection channel 30 of the connection member 3.

The first gas channels 43 and the second gas channels 44 are configured such that a pressure loss of gas in the first gas channels 43 is smaller than a pressure loss of gas in the second gas channels 44. Note that, as in this embodiment, if a plurality of first gas channels 43 and a plurality of second gas channels 44 are present, the first gas channels 43 and the second gas channels 44 are configured such that an average value of pressure losses of gas in the first gas channels 43 is smaller than an average value of pressure losses of gas in the second gas channels 44.

For example, the flow channel cross-sectional area of each first gas channel 43 can be larger than the flow channel cross-sectional area of each second gas channel 44. Note that, if the number of first gas channels 43 is different from the number of second gas channels 44, the sum of the flow channel cross-sectional areas of the first gas channels 43 can be larger than the sum of the flow channel cross-sectional areas of the second gas channels 44.

The sum of the flow channel cross-sectional areas of the second gas channels 44, although not particularly limited, may be set to about 20% to 95% of the sum of the flow channel cross-sectional areas of the first gas channels 43. Note that the flow channel cross-sectional area of a first gas channel 43 may be set to about 0.5 to 20 mm$^2$, for example. Also, the flow channel cross-sectional area of a second gas channel 44 may be set to about 0.1 to 15 mm$^2$, for example.

Note that the flow channel cross-sectional area of the first gas channel 43 refers to the flow channel cross-sectional area of the first gas channel 43 on the cross-section obtained by cutting the first gas channel 43 along a plane (the YZ plane) orthogonal to a direction (the X-axis direction) in which the first gas channel 43 extends. Also, an average value of the flow channel cross-sectional area at any position on the lower end portion 41 side, the flow channel cross-sectional area at any position of the central portion, and the flow channel cross-sectional area at any position on the upper end portion 42 side can be used as the flow channel cross-sectional area of the first gas channel 43.

Also, the flow channel cross-sectional area of the second gas channel 44 refers to the flow channel cross-sectional area of the second gas channel 44 on the cross-section obtained by cutting the second gas channel 44 along a plane (the YZ plane) orthogonal to a direction (the X-axis direction) in which the second gas channel 44 extends. Also, an average value of the flow channel cross-sectional area at any position on the lower end portion 41 side, the flow channel cross-sectional area at any position of the central portion, and the flow channel cross-sectional area at any position on the upper end portion 42 side can be used as the flow channel cross-sectional area of the second gas channel 44.

As shown in FIG. 3, the support substrate 4 includes the first main surface 45 and the second main surface 46. The first main surface 45 and the second main surface 46 face away from each other. The first main surface 45 and the second main surface 46 support power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved. As shown in FIG. 1, the support substrates 4 are disposed such that the first main surfaces 45 and the second main surfaces 46 face each other.

As shown in FIG. 3, the support substrate 4 supports power generation element portions 5. The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep gas that is diffused from the first gas channels 43 and the second gas channels 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

Power Generation Element Portion

The plurality of power generation element portions 5 are supported on the first main surface 45 and the second main surface 46 of the support substrate 4. The power generation element portions 5 are arranged in the length direction (the X-axis direction) of the support substrate 4. Specifically, the power generation element portions 5 are disposed at intervals from the lower end portion 41 to the upper end portion 42 on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the fuel gas supply chamber 21 and the fuel gas collection chamber 22 can be referred to as a boundary portion between the first portion 51 and the second portion 52.

In the thickness view (the Z-axis view) of the support substrate 4, the first gas channels 43 overlap the first portions 51 of the power generation element portions 5. Also, in the thickness view (the Z-axis view) of the support substrate 4, the second gas channels 44 overlap the second portions 52 of the power generation element portions 5. Note that some of the first gas channels 43 need not overlap the first portions 51. Similarly, some of the second gas channels 44 need not overlap the second portions 52.

Figure 5:
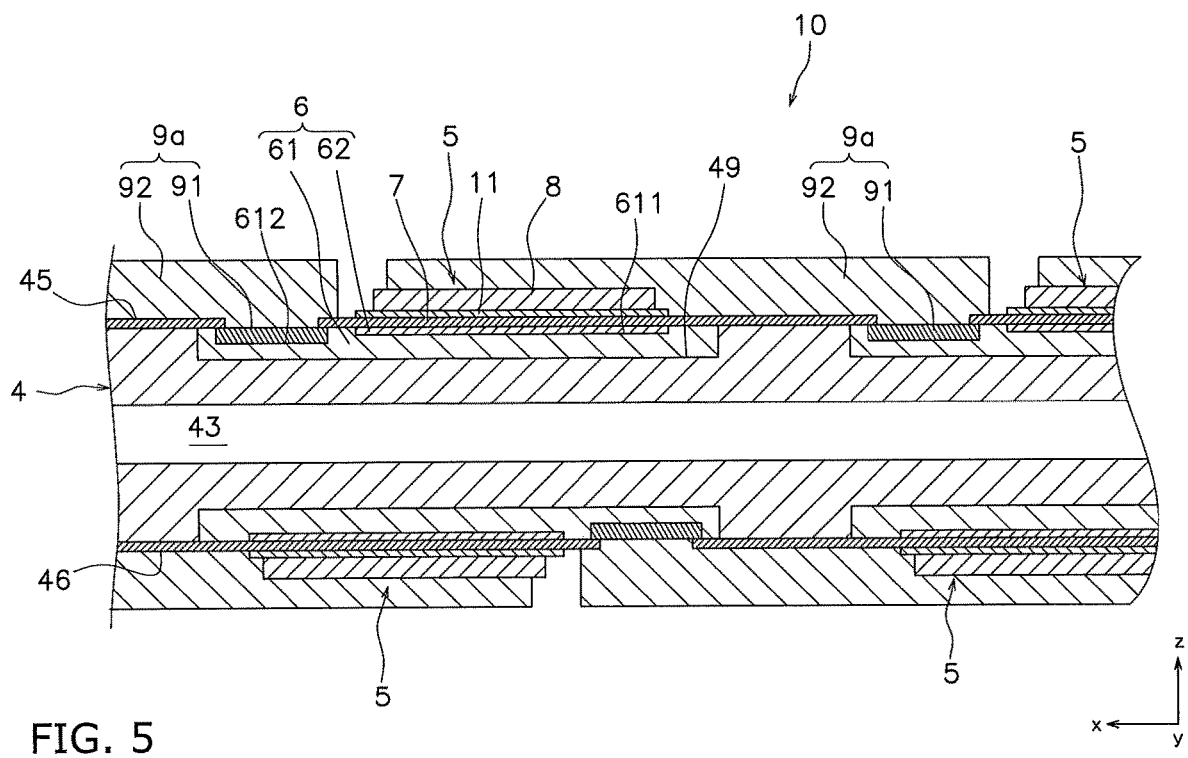
FIG. 5 is a cross-sectional view of the fuel cell.

FIG. 5 is a cross-sectional view of the fuel cell 10 cut along the first gas channel 43. Note that the cross-sectional view of the fuel cell 10 cut along the second gas channel 44 is the same as that in FIG. 5, except that the flow channel cross-sectional area of the second gas channel 44 is different from that in FIG. 5.

The power generation element portions 5 include fuel electrodes 6, the electrolytes 7, and air electrodes 8. Also, the power generation element portions 5 further include reaction preventing films 11. The fuel electrode 6 is a sintered body constituted by a conductive porous material. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61, and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 have a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 µm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd)O$_2$ (gadolinium doped ceria), for example. The reaction preventing film 11 has a thickness of about 3 to 50 µm, for example.

The air electrode 8 is disposed on the reaction preventing film 11. The air electrode 8 is a sintered body constituted by a conductive porous material. The air electrode 8 may be constituted by LSCF=(La, Sr) (Co, Fe)O$_3$ (lanthanum strontium cobalt ferrite), for example. Alternatively, the air electrode 8 may also be constituted by LSF=(La, Sr)FeO$_3$ (lanthanum strontium ferrite), LNF=La(Ni, Fe)O$_3$ (lanthanum nickel ferrite), LSC (La, Sr) CoO$_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 µm, for example.

Connection Member

As shown in FIG. 4, the connection member 3 is attached to the upper end portion 42 of the support substrate 4. Also, the connection member 3 includes a connection channel 30 for connecting the first gas channels 43 and the second gas channels 44. Specifically, the connection channel 30 connects the first gas channels 43 and the second gas channels 44. The connection channel 30 is constituted by a space extending from the first gas channels 43 to the second gas channels 44. The connection member 3 is preferably joined to the support substrate 4. Also, the connection member 3 is preferably formed as a single body with the support substrate 4. Note that the number of connection channels 30 is smaller than the number of first gas channels 43. In this embodiment, a plurality of first gas channels 43 and a plurality of second gas channels 44 are connected to each other by only one connection channel 30.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

First Electrical Connection Portion

A first electrical connection portion 9a extends from the power generation element portion 5 in the length direction (the X-axis direction) of the fuel cell 10. For example, the first electrical connection portion 9a is configured to electrically connect power generation element portions 5 adjacent in the X-axis direction. Also, the first electrical connection portion 9a disposed on the most upper end portion 102 side of the fuel cell 10 electrically connects the power generation element portion 5 and the current collector member 13. Note that the first electrical connection portion 9a does not extend across the first main surface 45 and the second main surface 46 of the support substrate 4. That is, the first electrical connection portion 9a is not formed on the side surfaces 47 of the support substrate 4, and the first electrical connection portion 9a formed on the first main surface 45 is not linked to the first second main surface 9a formed on the second main surface 46.

In this manner, the power generation element portions 5 are connected in series by the first electrical connection portions 9a from the upper end portion 102 to the lower end portion 101 of the fuel cell 10, on each of the first main surface 45 and the second main surface 46.

The first electrical connection portion 9a for connecting adjacent power generation element portions 5 includes an interconnector 91 and an air electrode current collector portion 92. The interconnector 91 is disposed in the second recess 612. Specifically, the interconnector 91 is embedded in the second recess 612 (the second recess 612 is filled with the interconnector 91). The interconnector 91 is a sintered body constituted by a conductive compact material. The interconnector 91 is more compact than the support substrate 4. For example, the interconnector 91 has a porosity of about 0% to 7%. The interconnector 91 may be constituted by LaCrO$_3$ (lanthanum chromite), for example. Alternatively, the interconnector 91 may also be constituted by (Sr, La)TiO$_3$ (strontium titanate). The interconnector 91 has a thickness of 10 to 100 µm, for example.

The air electrode current collector portion 92 is disposed to extend between the interconnector 91 and the air electrode 8 of adjacent power generation element portions 5. For example, the air electrode current collector portion 92 is disposed such that the air electrode 8 of the power generation element portion 5 disposed on the left side in FIG. 5 and the interconnector 91 of the power generation element portion 5 disposed on the right side in FIG. 5 are electrically connected to each other. The air electrode current collector portion 92 is a sintered body constituted by a conductive porous material.

The air electrode current collector portion 92 may be constituted by LSCF=(La, Sr) (Co, Fe)O$_3$ (lanthanum strontium cobalt ferrite), for example. Alternatively, the air electrode current collector portion 92 may also be constituted by LSC=(La, Sr) CoO$_3$ (lanthanum strontium cobaltite). Alternatively, the air electrode current collector portion 92 may also be constituted by Ag (silver) or Ag—Pd (a silver palladium alloy). The air electrode current collector portion 92 has a thickness of about 50 to 500 µm, for example.

Second Electrical Connection Portion

Figure 6:
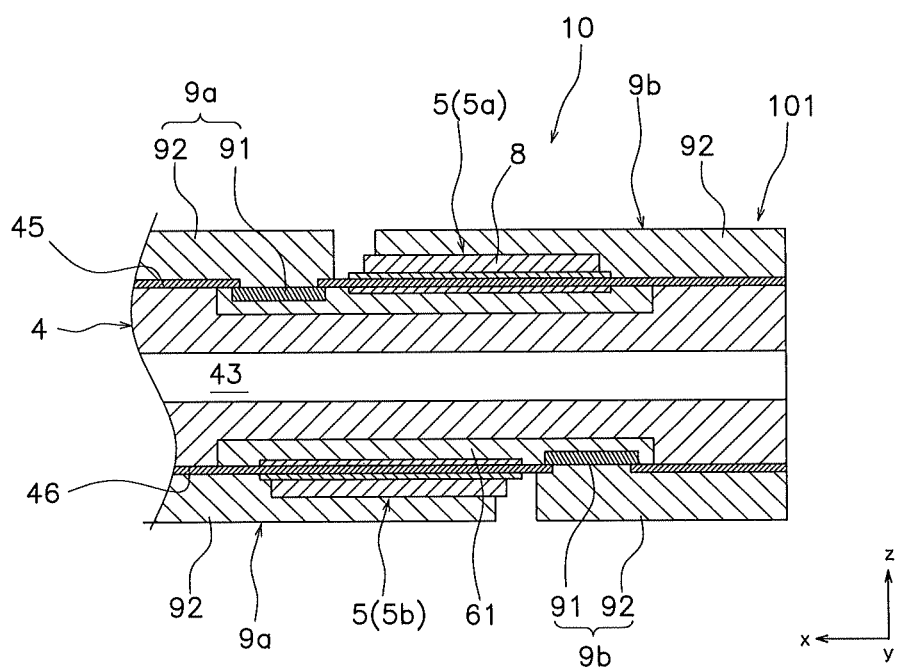
FIG. 6 is an enlarged cross-sectional view of the fuel cell in a lower end portion.

As shown in FIG. 6, the second electrical connection portion 9b electrically connects a power generation element portion 5a (referred to as a "first power generation element portion 5a" hereinafter) formed on the first main surface 45 of the same fuel cell 10 and a power generation element portion 5b (referred to as a "second power generation element portion 5b" hereinafter) formed on the second main surface 46. The second electrical connection portion 9b electrically connects the first power generation element portion 5a and the second power generation element portion 5b in the lower end portion 101 of the fuel cell 10.

Specifically, the second electrical connection portion 9b electrically connects the first power generation element portion 5a out of the plurality of first power generation element portions 5a that is disposed on the most lower end portion 101 side and the second power generation element portion 5b out of the plurality of second power generation element portions 5b that is disposed on the most lower end portion 101 side. Note that, in this embodiment, the second electrical connection portion 9b electrically connects the air electrode 8 of the first power generation element portion 5a and the fuel electrode current collector portion 61 of the second power generation element portion 5b.

The second electrical connection portion 9b includes an air electrode current collector portion 92 and an interconnector 91. The configurations of the air electrode current collector portion 92 and the interconnector 91 of the second electrical connection portion 9b are the same as those of the air electrode current collector portion 92 and the interconnector 91 of the above-described first electrical connection portion 9a, and thus a detailed description thereof is omitted.

The second electrical connection portion 9b extends across the first main surface 45 and the second main surface 46 of the support substrate 4. That is, the second electrical connection portion 9b extends from the first main surface 45 of the support substrate 4 to the second main surface 46 via both side surfaces 47. The second electrical connection portion 9b has an annular shape.

In this manner, the plurality of first power generation element portions 5a that are connected in series on the first main surface 45 and the plurality of second power generation element portions 5b that are connected in series on the second main surface 46 are connected in series by the second electrical connection portion 9b in the lower end portion 101 of the fuel cell 10.

Current Collector Member

Figure 7:
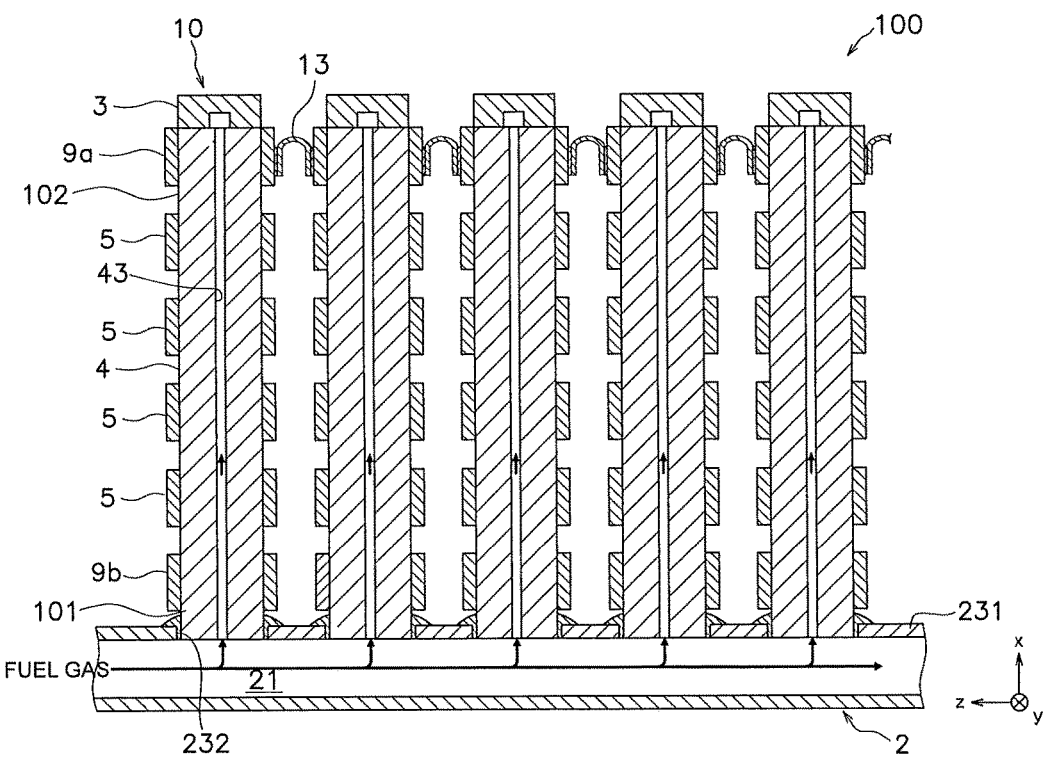
FIG. 7 is a side view of the cell stack device.

As shown in FIG. 7, the current collection members 13 are disposed between adjacent fuel cells 10. Also, the current collector members 13 electrically connect adjacent fuel cells 10 to each other. The current collection members 13 join the upper end portions 102 of adjacent fuel cells 10 to each other. For example, the current collector member 13 is disposed on the upper end side with respect to the power generation element portion 5 that is disposed on the most upper end side, out of the plurality of power generation element portions 5 disposed on both main surfaces of the support substrate 4.

Figure 8:
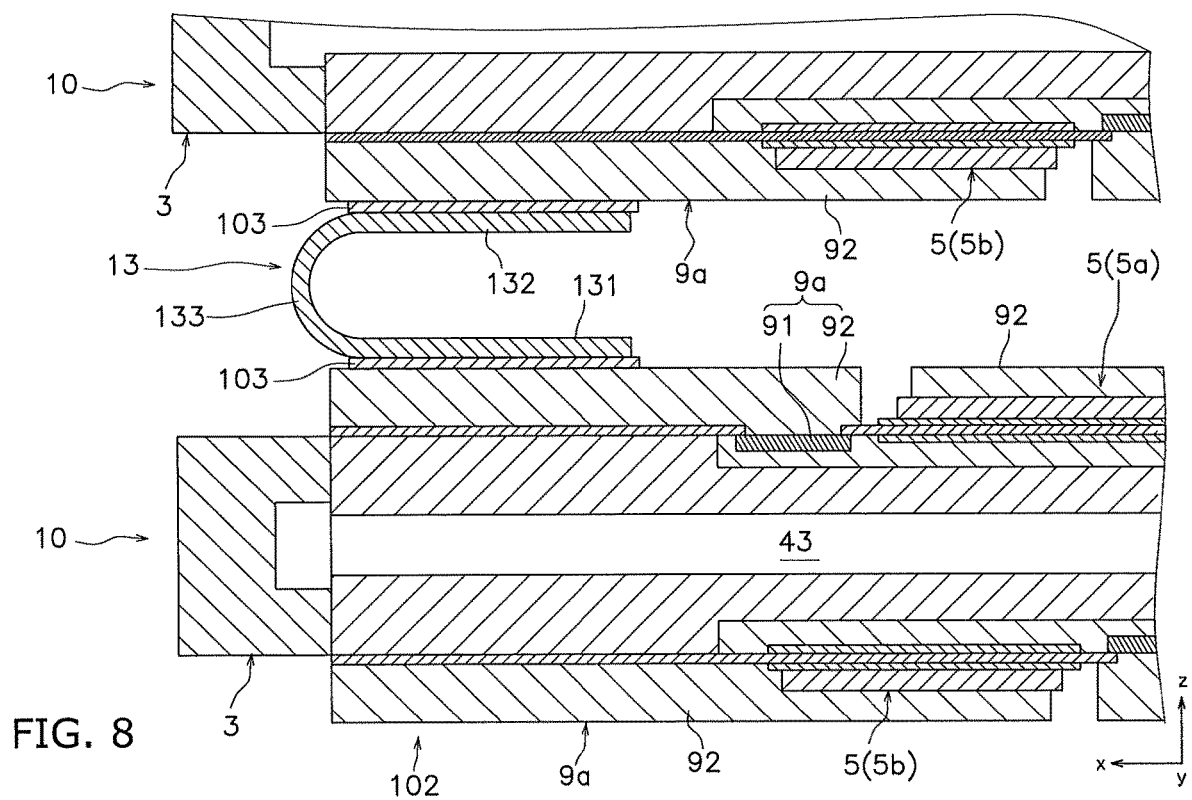
FIG. 8 is an enlarged cross-sectional view of the fuel cell in an upper end portion.

As shown in FIG. 8, the current collector member 13 electrically connects, to each other, the first power generation element portion 5a disposed on the most upper end side of the fuel cell 10 out of the plurality of first power generation element portions 5a and the second power generation element portion 5b disposed on the most upper end side of the fuel cell 10 out of the plurality of second power generation element portions 5b.

The current collector member 13 is joined to the first electrical connection portion 9a extending from the power generation element portion 5 via a conductive bonding material 103. A known conductive ceramic material or the like can be used as the conductive bonding material 103. For example, the conductive bonding material 103 may be constituted by at least one selected from (Mn, Co)$_3$O$_4$, (La, Sr)MnO$_3$, (La, Sr) (Co, Fe)O$_3$, and the like.

Figure 9:
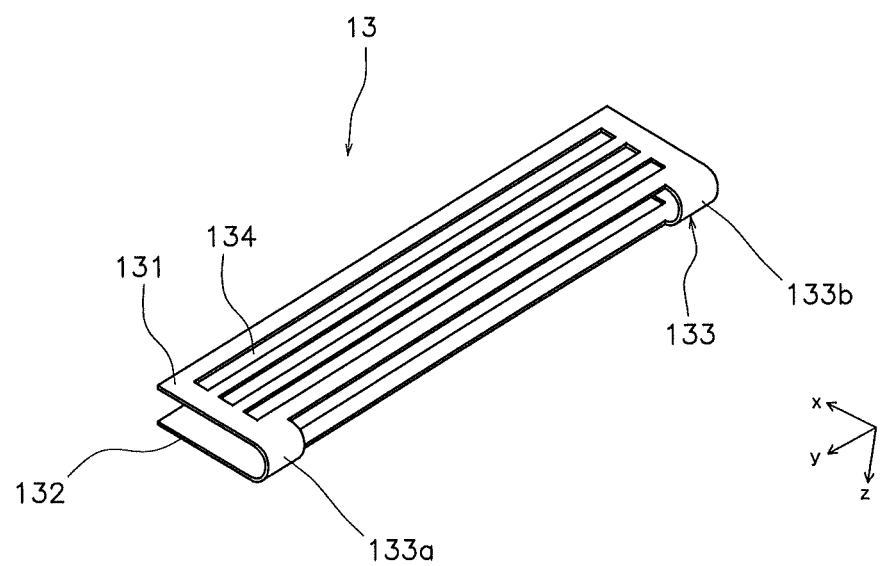
FIG. 9 is a perspective view of a current collector member.

As shown in FIG. 9, the current collector member 13 has a plate shape. For example the current collector member 13 may be constituted by a metal plate (e.g., a stainless steel plate) that has been subjected to holding. The current collector member 13 includes a first joining portion 131, a second joining portion 132, and a linking portion 133.

As shown in FIG. 8, the first joining portion 131 is joined to one of adjacent fuel cells 10. Specifically, the first joining portion 131 is joined to the first electrical connection portion 9a extending from the power generation element portion 5 of the fuel cell 10 by the conductive bonding material 103. Note that in this embodiment, the first electrical connection portion 9a to which the first joining portion 131 is joined is constituted by the interconnector 91 and the air electrode current collector portion 92.

As shown in FIG. 9, the first joining portion 131 is formed into a flat plate shape. Although the first joining portion 131 has a rectangular shape extending in the width direction (the Y-axis direction) in this embodiment, there is no particular limitation on the shape of the first joining portion 131, and the shape thereof may be a polygon other than a triangle, a circle, an ellipse, or a complex shape other than these shapes.

As shown in FIG. 8, the second joining portion 132 is electrically connected to the first joining portion 131. The second joining portion 132 is joined to the other of adjacent fuel cells 10. Specifically, the second joining portion 132 is joined to the first electrical connection portion 9a extending from the power generation element portion 5 of the fuel cell 10 by the conductive bonding material 103. Note that in this embodiment, the first electrical connection portion 9a to which the second joining portion 132 is joined is constituted by the air electrode current collector portion 92. The second joining portion 132 faces the first joining portion 131 in the arrangement direction (the Z-axis direction).

As shown in FIG. 9, the second joining portion 132 is formed into a flat plate shape. The shape of the second joining portion 132 is the same as the first joining portion 131 in this embodiment, but may be different from that of the first joining portion 131. There is no particular limitation on the shape of the second joining portion 132, and the shape thereof may be a polygon other than a triangle, a circle, an ellipse, or a complex shape other than these shapes.

The first joining portion 131 and the second joining portion 132 are provided with a plurality of through-holes 134. Each through-hole 134 is filled with the conductive bonding material 103. This makes it possible to improve the force by which the first joining portion 131 and the second joining portion 132 are joined to the fuel cell 10. The conductive bonding material 103 may protrude outward from the through-holes 134, and further spread on the outer surface of the first joining portion 131 or the second joining portion 132.

Note that, although the through-holes 134 are each formed into a rectangular shape extending in the width direction, there is no particular limitation on the shape of each through-hole 134, and the shape thereof may be a circle, an ellipse, a polygon other than a triangle, or a complex shape other than these shapes. Also, the number and positions of through-holes 134 can be changed as appropriate.

The link portion 133 links the first joining portion 131 and the second joining portion 132. Although the linking portion 133 includes a pair of linking pieces 133a and 133b in this embodiment, the configuration of the linking portion 133 is not limited thereto. Also, although the linking portion 133 is curved, the configuration thereof is not limited thereto. The linking portion 133 may have a flat plate shape, or a shape in which at least one portion is bent. The linking portion 133 can undergo elastic deformation.

Also, although the linking portions 133 are disposed on both end portions of the current collector member 13 in this embodiment, there is no particular limitation on the position of the linking portion 133.

Oxygen-Containing-Gas Ejection Portion

As shown in FIGS. 1 and 4, the oxygen-containing-gas ejection portion 12 is disposed on the upper side of the fuel cells 10. The oxygen-containing-gas ejection portion 12 ejects oxygen-containing gas (e.g., air) from the upper side of the fuel cells 10 toward the fuel cells 10. That is, the oxygen-containing-gas ejection portion 12 ejects oxygen-containing gas downward. Thus, oxygen-containing gas flows downward along the outer surfaces of the fuel cells 10. Note that arrows G shown in FIG. 4 indicate an oxygen-containing-gas ejection direction.

The oxygen-containing-gas ejection portion 12 has a plurality of ejection ports 121 that are open downward, for example. Oxygen-containing gas is ejected from the ejection ports 121 toward the fuel cells 10. Oxygen-containing gas ejected toward the fuel cells 10 is supplied between fuel cells 10, and flows downward along the outer surfaces of the fuel cells 10.

Method for Generating Power

In the cell stack device 100 configured as described above, fuel gas such as hydrogen gas is supplied to the fuel gas supply chamber 21 of the manifold 2, and oxygen-containing gas such as air is ejected from the oxygen-containing-gas ejection portion 12 to the fuel cells 10. Then, a chemical reaction indicated by Equation (1) below occurs in the air electrode 8, a chemical reaction indicated by Equation (2) occurs in the fuel electrode 6, and a current flows.

$$(\tfrac{1}{2}) \cdot O_2 + 2e^- \rightarrow O^{2-} \qquad (1)$$

$$H_2 + O^{2-} \rightarrow H_2O + 2e^- \qquad (2)$$

Specifically, fuel gas supplied to the fuel gas supply chamber 21 flows through the first gas channels 43 of the fuel cells 10, and the chemical reaction indicated by Equation (2) above occurs in the fuel electrodes 6 of the power generation element portions 5. Unreacted fuel gas in the fuel electrodes 6 leaves the first gas channels 43 and is supplied to the second gas channels 44 via the connection channel 30 of the connection member 3. Then, fuel gas supplied to the second gas channels 44 undergoes the chemical reaction indicated by Equation (2) above in the fuel electrodes 6 again. Unreacted fuel gas in the fuel electrodes 6 in a process in which fuel gas flows through the second gas channels 44 is collected in the fuel gas collection chamber 22 of the manifold 2.

Variations

Although embodiments of the present invention have been described above, the present invention is not limited thereto, and various modifications can be made without departing from the spirit of the present invention.

Variation 1

Although the oxygen-containing-gas ejection portion 12 is disposed on the upper side of the fuel cells 10 in the above-described embodiment, the arrangement of the oxygen-containing-gas ejection portion 12 is not limited thereto, and at least a portion of the oxygen-containing-gas ejection portion 12 need only be disposed upward of the center of the fuel cells 10.

Figure 10:
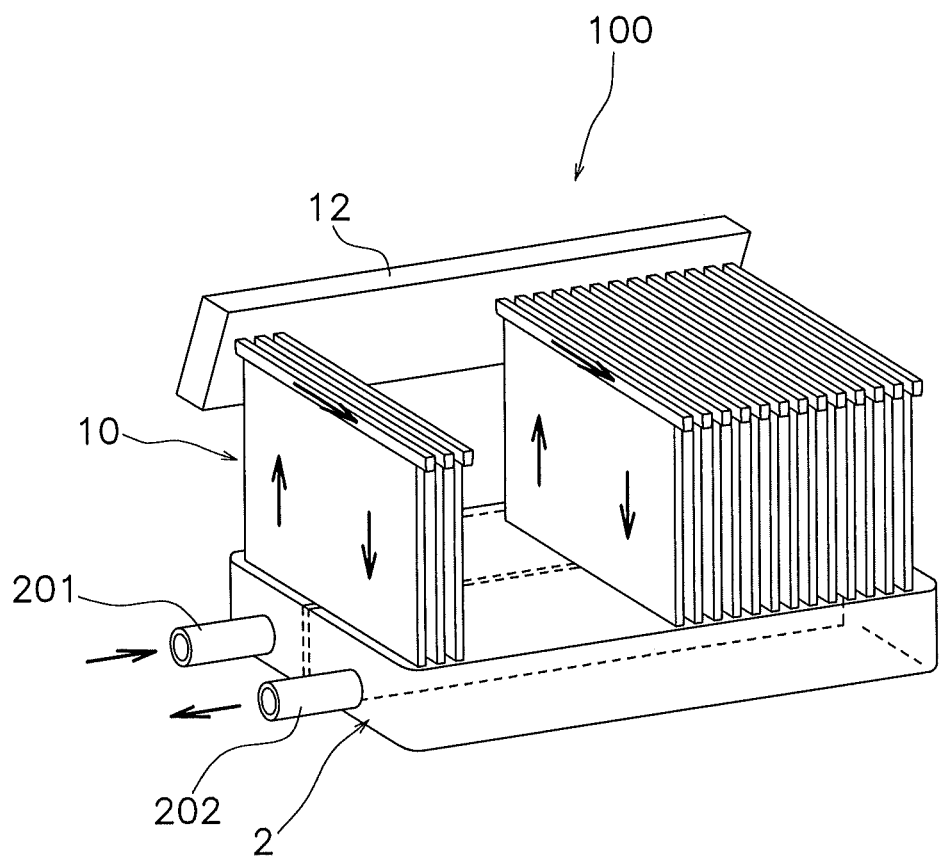
FIG. 10 is a perspective view of a cell stack device according to a variation.
Figure 10:
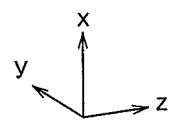
Figure 11:
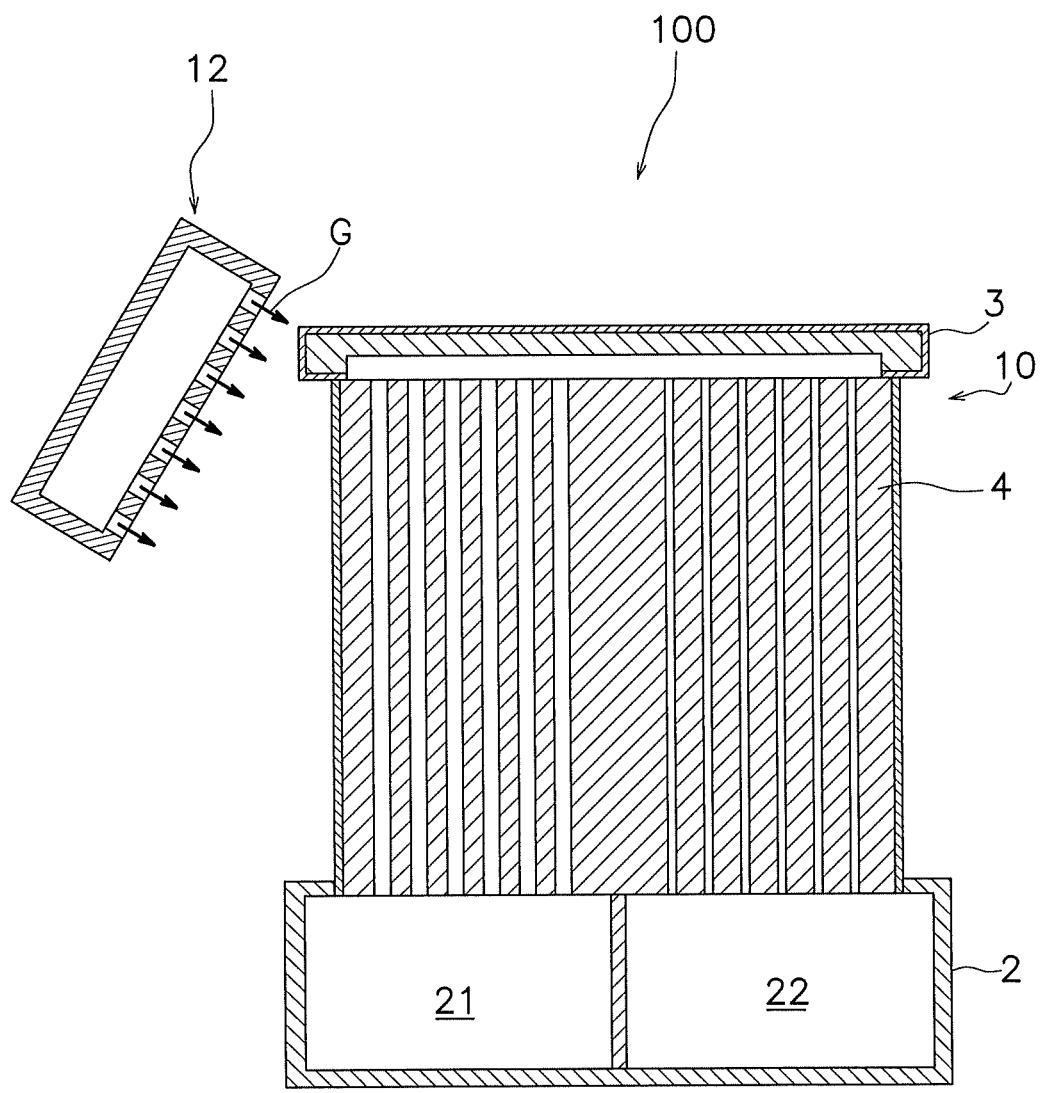
FIG. 11 is a cross-sectional view of a cell stack device according to a variation.

For example, as shown in FIGS. 10 and 11, the oxygen-containing-gas ejection portion 12 may also be disposed on the side of the fuel cells 10. The oxygen-containing-gas ejection portion 12 is disposed upward of the center of the fuel cells 10, and need not be disposed on the lower side thereof.

It is preferable that the oxygen-containing-gas ejection portion 12 is disposed such that the direction in which oxygen-containing gas is ejected downward from the oxygen-containing-gas ejection portion 12 is oriented downward. Specifically, the ejection direction of the oxygen-containing-gas ejection portion 12 is preferably inclined to be oriented downward with respect to the horizontal direction.

Figure 12:
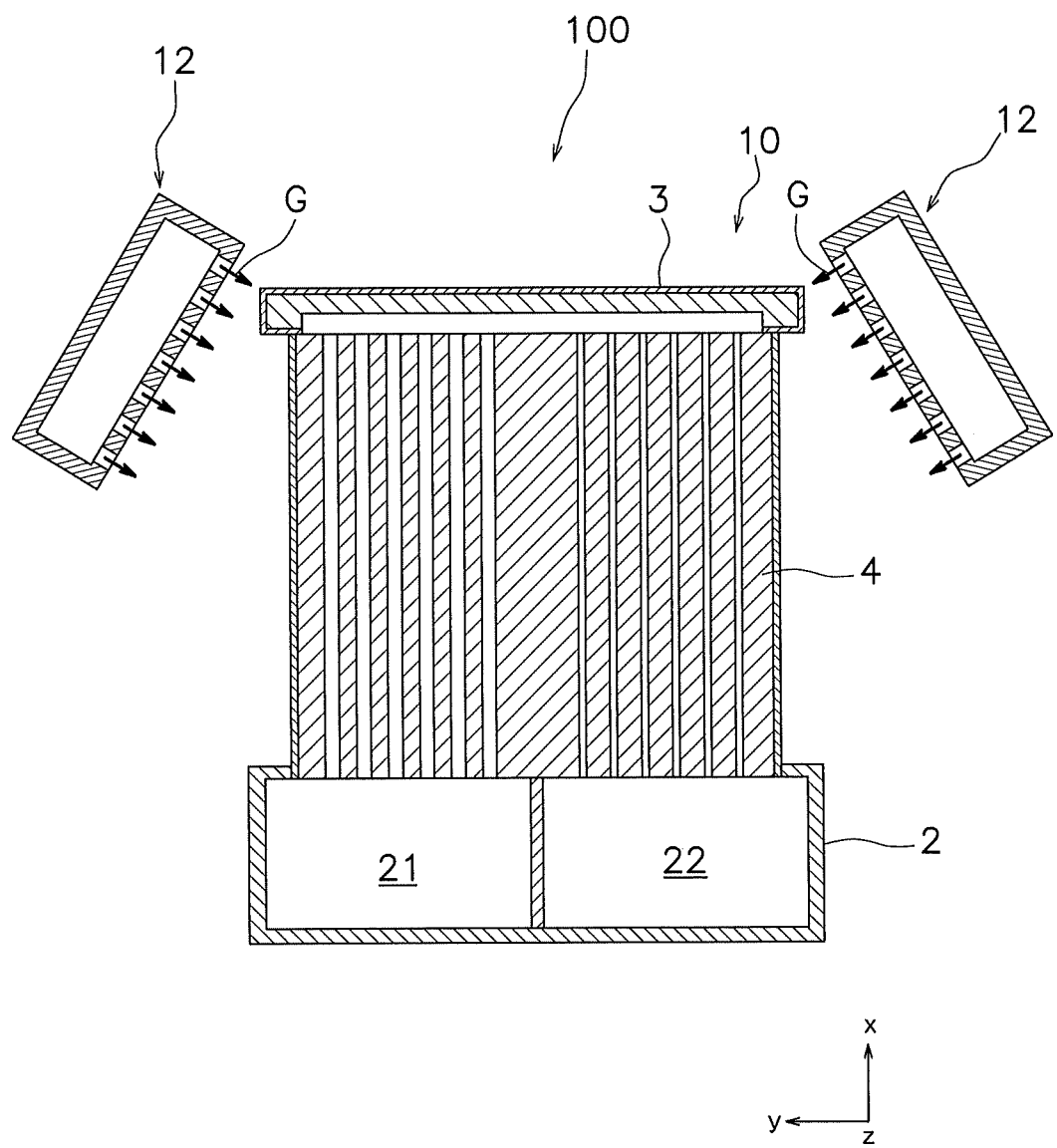
FIG. 12 is a cross-sectional view of a cell stack device according to a variation.

As shown in FIG. 12, a pair of the oxygen-containing-gas ejection portions 12 may also be installed. The fuel cells 10 are disposed between the pair of oxygen-containing-gas ejection portions 12 in the width direction.

Variation 2

Although one oxygen-containing-gas ejection portion 12 is disposed on the upper side of the fuel cells 10 in the above-described embodiment, the configuration thereof is not limited thereto. For example, a plurality of the oxygen-containing-gas ejection portions 12 may be disposed on the upper side of the fuel cells 10.

Variation 3

Figure 13:
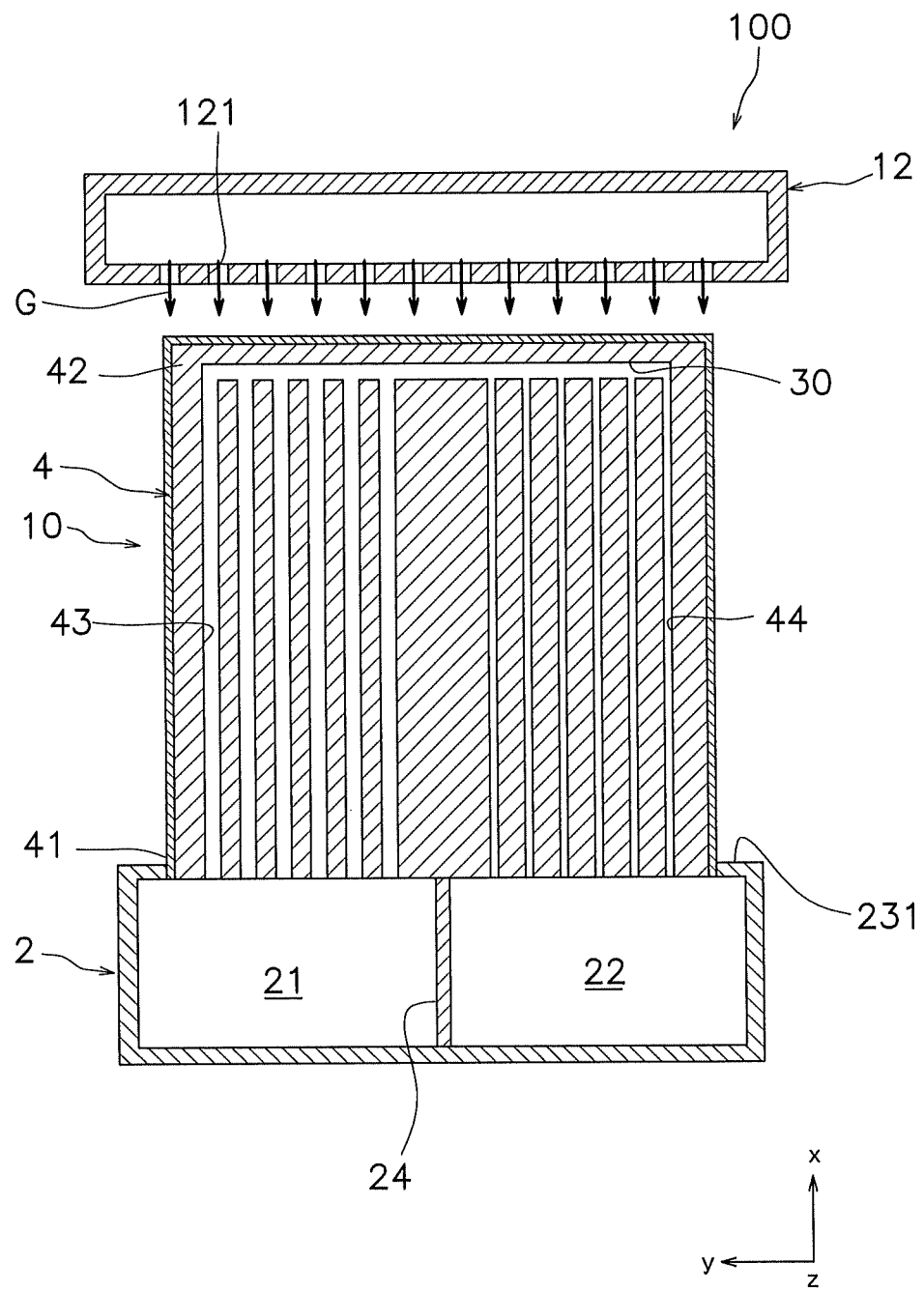
FIG. 13 is a cross-sectional view of a cell stack device according to a variation.

Although the first gas channels 43 and the second gas channels 44 are connected to each other by the connection channel 30 of the connection member 3 in the above-described embodiment, the configuration thereof is not limited thereto. For example, as shown in FIG. 13, the inner portion of the support substrate 4 may include the connection channel 30. In this case, the cell stack device 100 need not include the connection member 3. The first gas channels 43 and the second gas channels 44 are connected to each other by the connection channel 30 formed in the support substrate 4.

Variation 4

The first gas channels 43 may have different flow channel cross-sectional areas. Also, the second gas channels 44 may have different flow channel cross-sectional areas. Also, the flow channel cross-sectional area of the first gas channel 43 may be substantially the same as or smaller than the flow channel cross-sectional area of the second gas channel 44.

Variation 5

Figure 14:
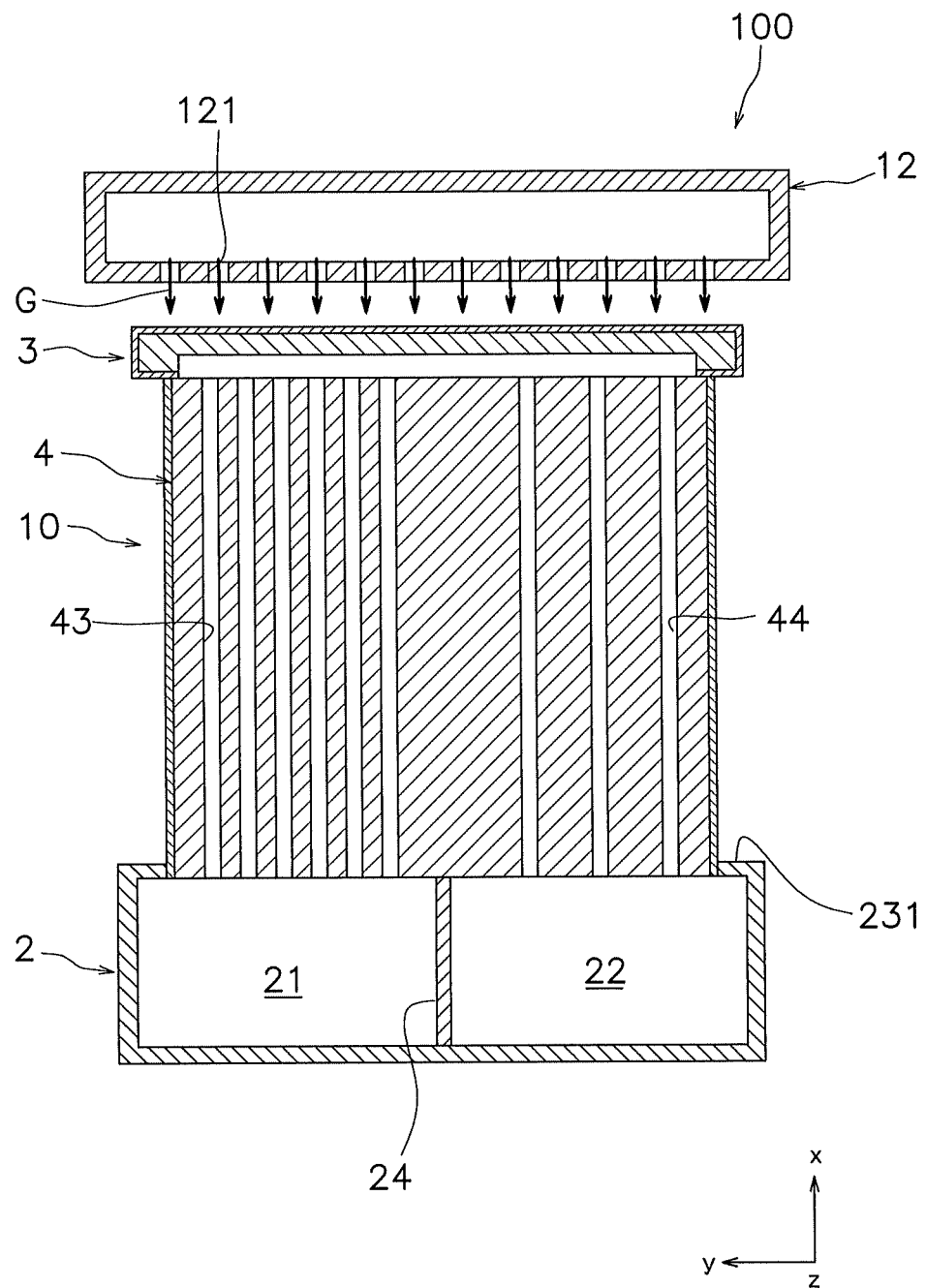
FIG. 14 is a cross-sectional view of a cell stack device according to a Variation.

Although the number of second gas channels 44 is the same as the number of first gas channels 43 in the above-described embodiment, the number of second gas channels 44 is not limited thereto. For example, as shown in FIG. 14, the number of second gas channels 44 may be smaller than the number of first gas channels 43.

Variation 6

The first gas channel 43 need not have an even flow channel cross-sectional area in its length direction (the X-axis direction). In particular, the flow channel cross-sectional area of the first gas channel 43 may become smaller toward the upper end portion 42 where the concentration of fuel gas is low. Also, the second gas channel 44 need not have an even flow channel cross-sectional area in the length direction (the X-axis direction). In particular, the flow channel cross-sectional area of the second gas channels 44 may become smaller toward the lower end portion 41 where the concentration of fuel gas is low. This configuration makes it possible to keep Ni whose diffusibility is increased and that is present in the vicinity of an interface from changing into NiO.

Variation 7

Although the first and second gas channels 43 and 44 have a circular cross-section in the above-described embodiment, the cross-sectional shape of the first and second gas channels 43 and 44 may be a rectangle or an eclipse.

Variation 8

The support substrate 4 includes a plurality of first gas channels 43 in the above-described embodiment, but may include only one first gas channel 43. Similarly, the support substrate 4 includes a plurality of second gas channels 44, but may include only one second gas channel 44.

Variation 9

Although the power generation element portions 5 disposed on the first main surface 45 are connected to each other in series in the above-described embodiment, it is not necessary for all the power generation element portions 5 disposed on the first main surface 45 to be connected to each other in series. Note that the same applies to the power generation element portions 5 disposed on the second main surface 46.

Variation 10

In the fuel cell 10, spaces between the power generation element portions 5 formed on the first main surface 45 and the power generation element portions 5 formed on the second main surface 46 need not be electrically connected to each other, or may be electrically connected to each other at a plurality of portions.

Variation 11

The power generation element portions 5 are disposed on both the first main surface 45 and the second main surface 46 in the above-described embodiment, but may be disposed on only one of the first main surface 45 and the second main surface 46.

Variation 12

The fuel cells 10 may have different widths. Also, the power generation element portions 5 may have different widths. For example, the width of each power generation element portion 5 formed on a given support substrate 4 may be different from the width of each power generation element portion 5 formed on another support substrate 4.

Variation 13

Although the connection member 3 is a porous member in an embodiment, the connection member 3 may be constituted by metal. Specifically, the connection member 3 can be constituted by an Fe—Cr alloy, a Ni-based alloy, MgO-based ceramic material (may be the same material as the support substrate 4), or the like.

Variation 14

Figure 15:
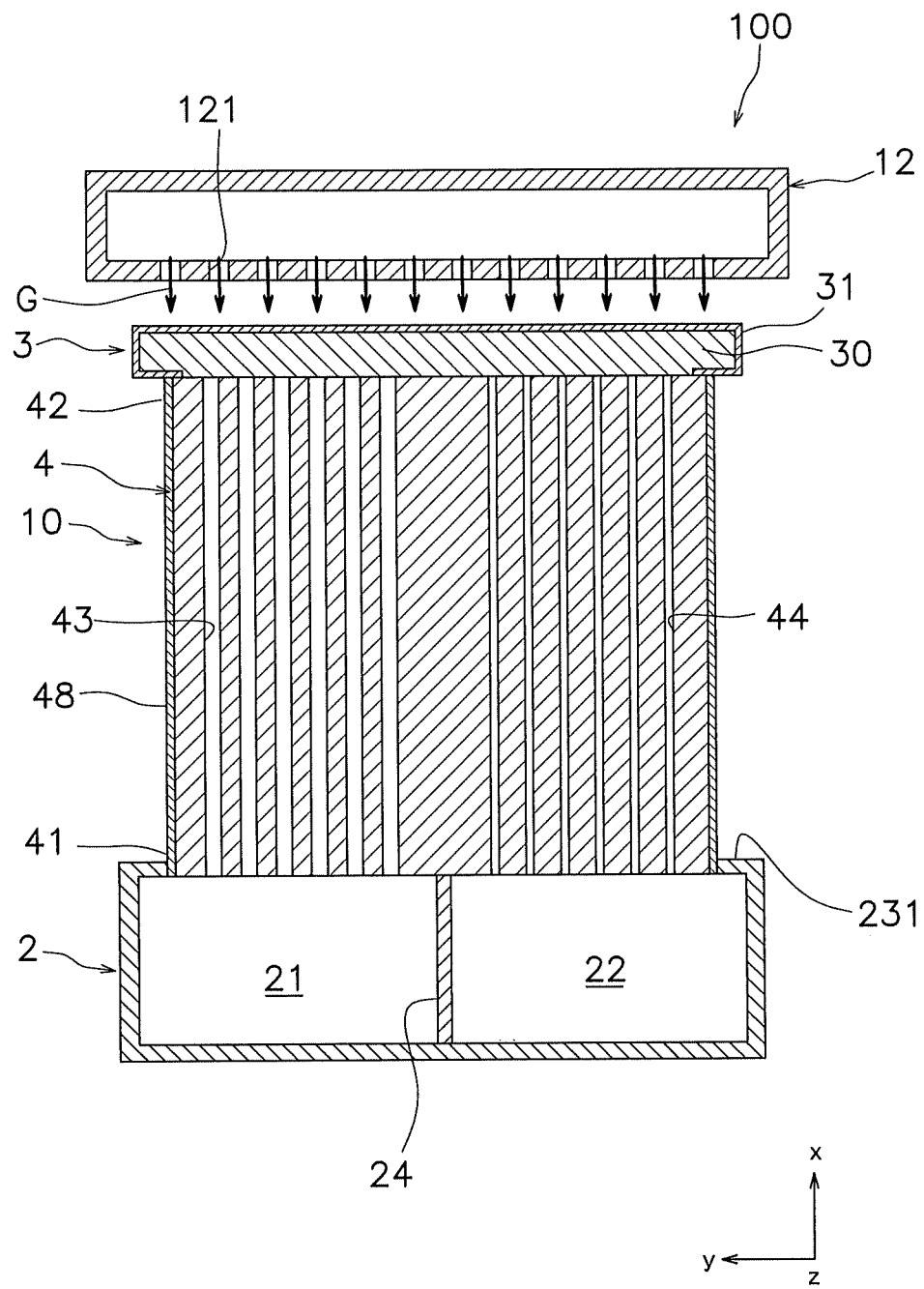
FIG. 15 is a cross-sectional view of a cell stack device according to a variation.

Although the connection channel 30 of the connection member 3 is constituted by a space in the above-described embodiment, the configuration of the connection channel 30 of the connection member 3 is not limited thereto. For example, as shown in FIG. 15, the connection channel 30 of the connection member 3 can be constituted by a plurality of pores formed in the connection member 3.

Variation 15

Although as a result of partitioning one manifold main body 23 with use of the partition plate 24, the fuel gas supply chamber 21 and the fuel gas collection chamber 22 are defined in the manifold 2 of the above-described embodiment, the configuration of the manifold 2 is not limited thereto. For example, the manifold 2 can also be constituted by two manifold main bodies 23. In this case, one manifold main body 23 includes the fuel gas supply chamber 21, and another manifold main body 23 includes the fuel gas collection chamber 22.

Variation 16

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

Variation 17

Figure 16:
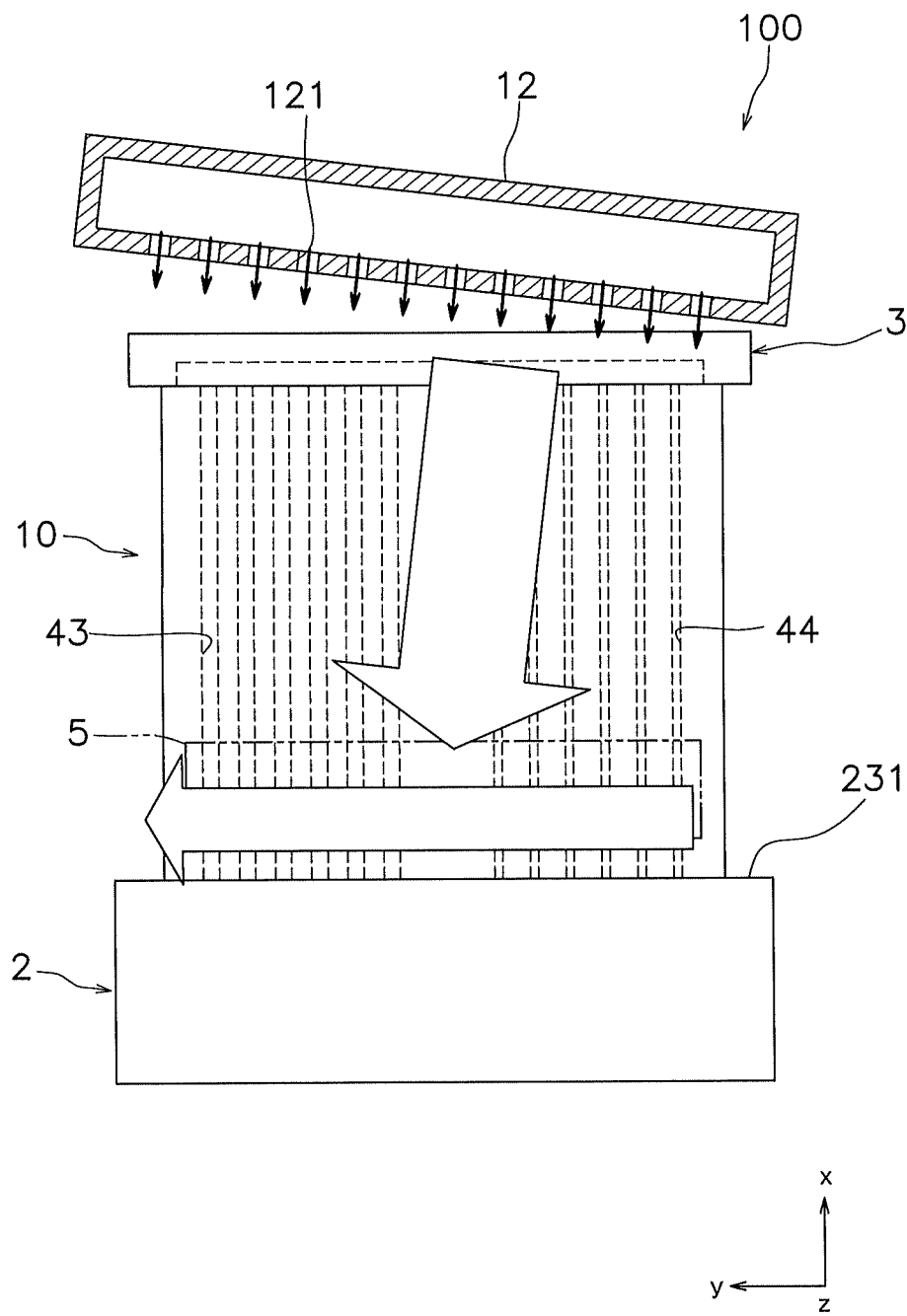
FIG. 16 is a front view of a cell stack device according to a variation.

The cell stack device 100 may further include an ejection direction adjustment means for adjusting the direction in which oxygen-containing gas is ejected. Oxygen-containing gas is ejected in the width direction (the Y-axis direction) of the fuel cells 10 in the lower end portions of the fuel cells 10. For example, as shown in FIG. 16, the ejection direction adjustment means may cause oxygen-containing gas to be ejected toward a first side (the left side in FIG. 16) in the width direction of the fuel cells 10. Note that the ejection direction adjustment means can be configured by tilting the oxygen-containing-gas ejection portion 12 such that the ejection ports 121 are oriented facing the first side. Oxygen-containing gas ejected from the oxygen-containing-gas ejection portion 12 collides with the upper plate portion 231 of the manifold 2, and is then ejected toward the first side in the width direction of the fuel cells 10.

Figure 17:
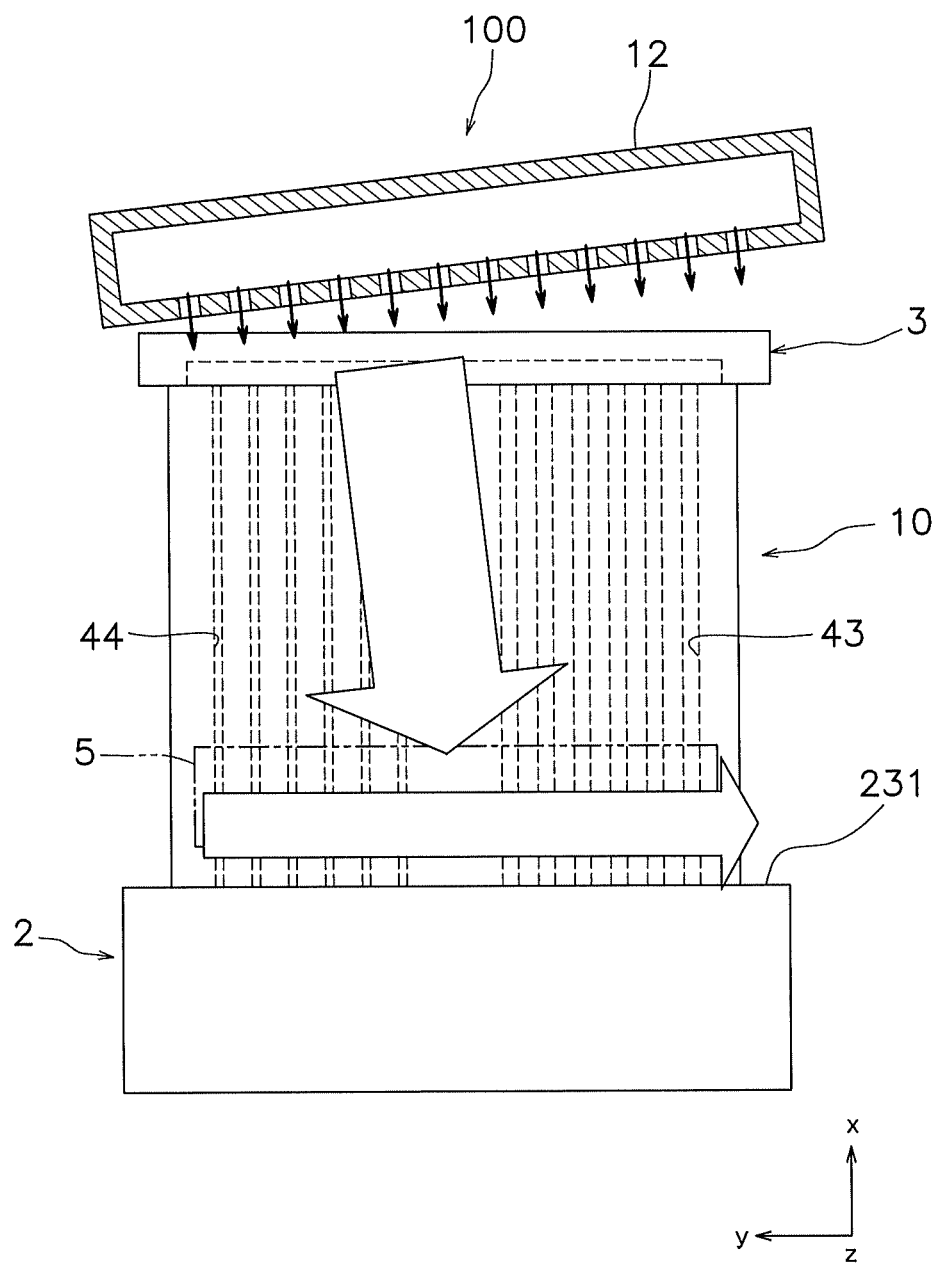
FIG. 17 is a front view of a cell stack device according to a variation.

Also, as shown in FIG. 17, the ejection direction adjustment means may cause oxygen-containing gas to be ejected toward a second side (the right side in FIG. 17) in the width direction of the fuel cells 10. With this configuration, oxygen-containing gas ejected from the oxygen-containing-gas ejection portion 12 collides with the upper plate portion 231 of the manifold 2, and is then ejected toward the second side in the width direction of the fuel cells 10.

Figure 18:
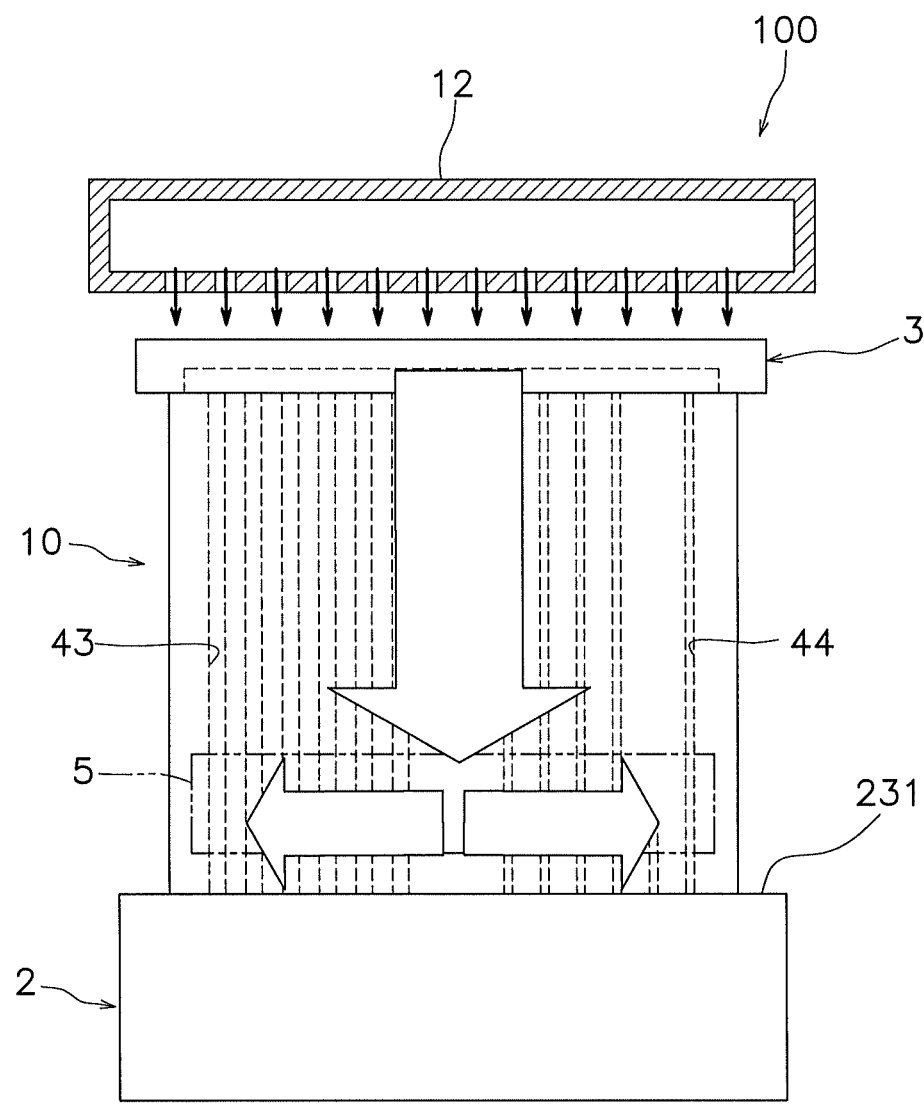
FIG. 18 is a front view of a cell stack device according to a variation.

Also, as shown in FIG. 18, the ejection direction adjustment means may cause oxygen-containing gas to be ejected toward both the first side and the second side in the width direction of the fuel cells 10. With this configuration, oxygen-containing gas ejected from the oxygen-containing-gas ejection portion 12 collides with the upper plate portion 231 of the manifold 2, and is then split into that ejected toward the first side and that ejected toward the second side in the width direction of the fuel cells 10.

Note that as the ejection direction adjustment means, in addition to a means for tilting the ejection ports 121 of the oxygen-containing-gas ejection portion 12, the direction in which oxygen-containing gas is ejected can also be adjusted by sealing gaps between adjacent fuel cells 10 in one end portion in the width direction (the Y-axis direction) of the fuel cells 10, for example.

For example, as shown in FIG. 16, if oxygen-containing gas is ejected toward the first side (the left side in FIG. 16) in the width direction of the fuel cells 10, as the ejection direction adjustment means, gaps between adjacent fuel cells 10 are sealed on the second side (the right side in FIG. 12) in the width direction of the fuel cells 10. With this configuration, oxygen-containing gas supplied to gaps between adjacent fuel cells 10 is ejected from the first side in the width direction of the fuel cells 10. Also, if oxygen-containing gas is ejected toward the second side in the width direction, it is sufficient that gaps between adjacent fuel cells 10 are sealed on the first side. In addition, oxygen-containing gas can also be ejected toward both the first side and the second side by adjusting the sealing area of gaps between fuel cells 10 on the first side in the width direction and the sealing area of gaps between the fuel cells 10 on the second side, for example.

The invention claimed is:

1. A cell stack device comprising:
    a manifold including a fuel gas supply chamber and a fuel gas collection chamber;
    a fuel cell extending upward from the manifold; and
    an oxygen-containing-gas ejection portion that is disposed upward of the center of the fuel cell and is configured to eject oxygen-containing gas toward the fuel cell, wherein the fuel cell includes
  a flat support substrate, and
  a power generation element portion disposed on a main surface of the support substrate,
the support substrate includes
  at least one first gas channel that is connected to the fuel gas supply chamber and extends upward from the fuel gas supply chamber, and
  at least one second gas channel that is connected to the fuel gas collection chamber, extends upward from the fuel gas collection chamber, and is connected to the first gas channel in an upper end portion of the fuel cell.

2. The cell stack device according to claim 1,
wherein the oxygen-containing-gas ejection portion is configured to eject oxygen-containing gas downward.

3. The cell stack device according to claim 1,
wherein the oxygen-containing-gas ejection portion is disposed on an upper side of the fuel cell, and is configured to eject oxygen-containing gas from the upper side of the fuel cell toward the fuel cell.

4. The cell stack device according to claim 1,
wherein the first gas channel is disposed on a first side in a width direction of the fuel cell,
the second gas channel is disposed on a second side in the width direction of the fuel cell, and
the cell stack device further comprises an ejection direction adjustment means for adjusting a direction in which the oxygen-containing gas is ejected, in a lower end portion of the fuel cell.

5. The cell stack device according to claim 4,
wherein the ejection direction adjustment means is configured to cause the oxygen-containing gas to be ejected toward the first side.

6. The cell stack device according to claim 4,
wherein the ejection direction adjustment means is configured to cause the oxygen-containing gas to be ejected toward the second side.

7. The cell stack device according to claim 4,
wherein the ejection direction adjustment means is configured to cause the oxygen-containing gas to be ejected toward both the first side and the second side.

8. The cell stack device according to claim 1,
wherein the support substrate further includes a connection channel for connecting the first gas channel and the second gas channel in an upper end portion of the support substrate.

9. The cell stack device according to claim 1,
wherein the fuel cell further includes a connection member that is attached to an upper end portion of the support substrate, and
the connection member includes a connection channel for connecting the first gas channel and the second gas channel.

10. The cell stack device according to claim 1, further comprising:
  a plurality of the fuel cells; and
  a current collector member that is disposed between adjacent fuel cells and is configured to electrically connect adjacent fuel cells to each other in the upper end portions of the fuel cells.

* * * * *